US008508746B2

(12) United States Patent
Wax et al.

(10) Patent No.: US 8,508,746 B2
(45) Date of Patent: Aug. 13, 2013

(54) INTERFEROMETRIC SYSTEMS HAVING REFLECTIVE CHAMBERS AND RELATED METHODS

(75) Inventors: Adam Wax, Durham, NC (US); Yizheng Zhu, Durham, NC (US); Natan Tzvi Shaked, Bat Yam, IL (US)

(73) Assignee: Duke University, Durham, NC (US)

( * ) Notice: Subject to any disclaimer, the term of this patent is extended or adjusted under 35 U.S.C. 154(b) by 343 days.

(21) Appl. No.: 13/072,294

(22) Filed: Mar. 25, 2011

(65) Prior Publication Data

US 2011/0242543 A1 Oct. 6, 2011

Related U.S. Application Data

(60) Provisional application No. 61/318,988, filed on Mar. 30, 2010.

(51) Int. Cl.
*G01B 9/021* (2006.01)

(52) U.S. Cl.
USPC .......................................... 356/457; 356/244

(58) Field of Classification Search
USPC .................................. 356/457–458, 244, 246
See application file for complete search history.

(56) References Cited

U.S. PATENT DOCUMENTS 8,379,218 B2 * 2/2013 Deck et al. ..................... 356/479

OTHER PUBLICATIONS

Rappaz, Benjamin; Measurement of the integral refractive index and dynamic cell morphometry of living cells with digital holographic microscopy; Optics Express 9361 vol. 13, No. 23; Switzerland; Nov. 14, 2005.
Popescu, Gabriel; Diffraction phase microscopy for quantifying cell structure and dynamics; Optical Society of America 0146-9592/06/060775-3; Cambridge, Massachusetts, USA; Dec. 5, 2005.
Anderson, Chris S.; Fringe visibility, irradiance, and accuracy in common path interferometers for visualization of phase disturbances; Applied Optics vol. 34, No. 32; Florida, USA; Nov. 10, 1995.
Shaked, Natan T.; Whole-cell-analysis of live cardiomyocytes using wide-field interferometric phase microscopy; Biomedical Optics Express vol. 1, No. 2; Durham, NC USA; Aug. 23, 2010.
Popescu, Gabriel; Imaging red blood cell dynamics by quantitative phase microscopy; Blood Cells, Molecules, and Diseases 41 (2008) 10-16; Cambridge, MA, USA; Jan. 29, 2008.
Park, YongKeun; Metabolic remodeling of the human red blood cell membrane; PNAS vol. 107 No. 4; Cambridge, MA, USA; Nov. 25, 2009.

(Continued)

*Primary Examiner* — Tarifur Chowdhury
*Assistant Examiner* — Jonathan Hansen
(74) *Attorney, Agent, or Firm* — Olive Law Group, PLLC

(57) ABSTRACT

Disclosed herein are interferometric systems having reflective chambers and related methods. According to an aspect, an interferometric system may include a light source for generating an illumination beam that propagates towards a sample. A sample holder may hold the sample and include a partially reflective cover for allowing a first portion of the illumination beam to pass therethrough to interact with the sample to produce a sample beam that propagates substantially along an optical axis. The cover may be oriented at an angle for reflecting a second portion of the illumination beam to produce a reference beam that propagates at a predetermined angle with respect to the optical axis. An imaging module may redirect the reference beam towards the optical axis at a detection plane. A detector may intercept the sample and reference beams and may generate a holographic representation of the sample based on the beams.

35 Claims, 9 Drawing Sheets

(56) References Cited

OTHER PUBLICATIONS

Rappaz, Benjamin; Comparative Study of Human Erythrocytes by Digital Holographic Microscopy, Confocal Microscopy, and Impedance Volume Analyzer; International Society for Advancement of Cytometry Cytometry Part A 73A: 895-903, 2008; Lausanne, Switzerland; May 29, 2008.

Park, YongKeun; Refractive index maps and membrane dynamics of human red blood cells parasitized by Plasmodium falciparum; PNAS vol. 105 No. 37 13730-13735; Cambridge, MA, USA; May 18, 2008.

Ballas, Samir K.; Definitions of the phenotypic manifestations of sickle cell disease; American Journal of Hematology 85:6-13, 2010; Philadelphia, PA, USA; Sep. 17, 2009.

Ballas, Samir K.; Sickle Red Cell Microrheology and Sickle Blood Rheology; Taylor & Francis Inc. Copyright 2004, Microcirculation, 11: 209-225, 2004, ISSN: 1073-9688 print, DOI: 10.1080/10739680490279410; PA, USA; Jun. 9, 2003.

Brandao, M. M.; Optical tweezers for measuring red blood cell elasticity: application to the study of drug response in sickle cell disease; European Journal of Haematology ISSN 0902-4441; Brazil; May 28, 2002.

Schnars, Ulf; Digital recording and numerical reconstruction of holograms; IOP Publishing Ltd. 0957-0233/02/090085 +17, (http://iopscience.iop.org/0957-0233/13/9/201); Bremen, Germany; Aug. 7, 2002.

* cited by examiner

INTERFEROMETRIC SYSTEMS HAVING REFLECTIVE CHAMBERS AND RELATED METHODS

CROSS REFERENCE TO RELATED APPLICATION

This application claims the benefit of U.S. provisional patent application No. 61/318,988, filed Mar. 30, 2010, the disclosure of which is incorporated herein by reference in its entirety.

GOVERNMENT RIGHTS NOTICE

This invention was made with government support under grant number CBET-0651622, awarded by the National Science Foundation. The government may have certain rights in the invention.

TECHNICAL FIELD

The presently disclosed subject matter relates to interferometry, and more specifically, to interferometric systems and methods for measuring biological samples or other samples.

BACKGROUND

Optically-transparent biological samples, such as isolated biological cells and certain microorganisms in culture, are three-dimensional dynamic entities, constantly changing their biophysical features, shapes, volumes, and spatial locations. These intrinsic transients can occur over time scales ranging from days to less than milliseconds. Tracking these dynamic phenomena can provide valuable spatial-temporal data for cell biology studies, as well as provide early indications of malfunctions due to disease which may be used as biomarkers. Wide-field digital interferometry (WFDI) is a label-free technique providing quantitative measurements of the optical path delays (OPDs) associated with optically-transparent samples. By recording the interference pattern between the light or beams that have interacted with the sample and the mutually-coherent reference wave, WFDI may capture the complex wavefront of sample field, containing information on the three-dimensional structure of the sample.

WFDI phase measurements of transparent biological sample dynamics are frequently performed by use of modified Mach-Zehnder or Michelson interferometric setups, where at least one microscope objective is inserted in the beam path to magnify the sample. The reference and sample arms in these conventional interferometers have different optical paths. The introduction of instability in the interferometric system, including differential vibrations or air perturbations in the interferometer arms, can cause measurement errors, and may significantly degrade the quality of the recorded phase profile of the sample.

Common-path interferometers can provide a partial solution to the aforementioned instability problem. This can be achieved by creating an overlap between the reference and sample beams, so that the same vibrations occur for both beam paths. Common-path interferometers can be useful in ambient conditions, where the interferometric system is not constructed on vibration-isolating optical tables, or the system cannot be enclosed to avoid differential air perturbations in the two interferometer arms.

Common-path interferometry can be implemented using on-axis WFDI geometry, requiring the acquisition of several phase-shifted interferograms for each instance of the sample, or using off-axis geometry, requiring the acquisition of only one interferogram per sample instance. The latter approach, however, requires the use of a diffraction grating and often other elements in the beam paths, which necessitates a dedicated optical system design, and an additional alignment process.

Accordingly, in view of the foregoing, there is a need for improved interferometric systems and techniques for measuring biological samples or other samples.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are interferometric systems having reflective chambers and related methods. According to an aspect, an interferometric system may include a light source for generating an illumination beam that propagates towards a sample. For example, the light source may be laser. A sample holder (also referred to herein as an interferometric chamber or "InCh") may hold the sample and include a partially reflective cover for allowing a first portion of the illumination beam to pass therethrough to interact with the sample to produce a sample beam that propagates substantially along an optical axis. The partially reflective cover may be oriented at an angle for reflecting a second portion of the illumination beam to produce a reference beam that propagates at a predetermined angle with respect to the optical axis. An imaging module may redirect the reference beam towards the optical axis at a detection plane. A detector may intercept the sample and reference beams and may generate a holographic representation of the sample based on the beams. A display may display one or more images of the holographic representation of the sample.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The present subject matter discloses interferometric systems and methods for generating holographic representations of samples, such as, but not limited to, biological samples. According to embodiments of the present disclosure, an interferometric system may include a light source configured to generate an illumination beam that propagates towards a sample. The system may also include a sample holder, also referred to herein as an interferometric chamber ("InCh"), that defines an interior for holding the sample. The sample holder may include a partially reflective cover of suitable material for allowing a portion of the illumination beam to pass therethrough to interact with the sample to produce a sample beam that propagates substantially along an optical axis. The partially reflective cover may be oriented at an angle with respect to the optical axis for reflecting another portion of the illumination beam to produce a reference beam that propagates at a predetermined angle with respect to the optical axis. An imaging module may be positioned to receive the sample and reference beams, and may be configured to redirect the reference beam towards the optical axis. For example, the imaging module may include multiple lenses positioned for redirecting the reference beam towards the optical axis. A detector may be positioned to intercept the sample and references beams along the optical axis at a detection plane. Further, the detector may be configured to generate a holographic representation of the sample based on the sample and reference beams.

Figure 1:
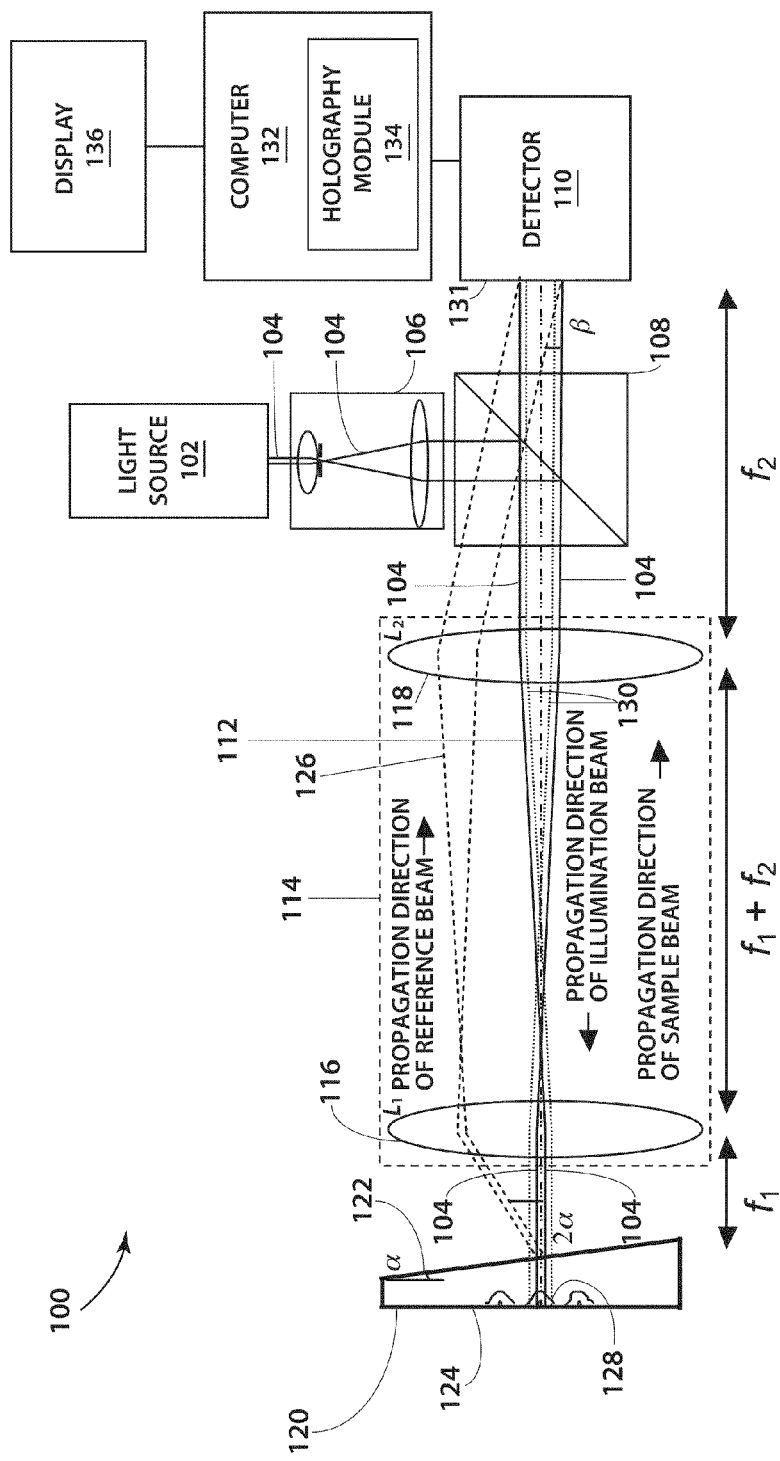
FIG. 1 is a schematic diagram of an interferometric system in accordance with embodiments of the present disclosure.

FIG. 1 illustrates a schematic diagram of an interferometric system 100 in accordance with embodiments of the present disclosure. Particularly, the interferometric system 100 shown in FIG. 1 is a close-to-common path interferometer, although the system and method embodiments disclosed herein may be applied to any suitable interferometer. Referring to FIG. 1, the system 100 may include a light source 102 configured to generate an illumination beam 104. For example, the light source 102 may be a laser capable of generating a coherent light. The light source 102 may be positioned to direct the illumination beam 104 towards a spatial filter-beam expander 106.

The filter-expander 106 may be configured to receive the illumination beam 104 and to spatially filter and expand the illumination beam 104. For example, the filter-expander 106 may include one or more lenses for expanding the illumination beam 104. Further, for example, the filter-expander 104 may include one or more shielding defining an aperture for spatially filtering the illumination beam 104. Downstream from the filtering and expansion components, the illumination beam 104 may exit the filter-expander 106 and propagate in a direction towards a beam splitter 108. In accordance with an embodiment, the filter-expander 106 may be configured to expand the illumination beam 104 such that the area of the generated plane wave is larger than the area of the recorded field of view on a detector 110.

In accordance with embodiments of the present disclosure, the detector 110 may be a digital camera configured to capture video or still images, or both. The digital camera may capture images via an electronic image sensor and may digitally record the captured images onto a suitable memory.

The beam splitter 108 is configured to reflect the illumination beam 104 in a direction substantially along an optical axis 112 and towards an imaging module 114 having a magnification of $f_1/f_2$. In this example, the imaging module 114 is a 4f imaging module including lenses $L_1$ 116 and $L_2$ 118 with focal lengths of $f_1$ and $f_2$, respectively. The lenses $L_1$ 116 and $L_2$ 118 are positioned along the optical axis for focusing the illumination beam 104 on a sample. Although two lenses are shown in this example, the imaging module 114 may include any suitable number and configuration of lenses or other suitable components for achieving a desired magnification. The illumination beam 104 may propagate along the optical axis 112 and through the imaging module 114 for de-magnification. Downstream from the lenses $L_1$ 116 and $L_2$ 118, the illumination beam 104 may exit the imaging module 114 and may propagate towards a sample holder 120. Although this example describes specifics of the configuration of lenses for the imaging module, it should be understood that any number and configuration of lenses or other components may be utilized in accordance with the presently disclosed subject matter.

In accordance with embodiments of the present disclosure, the sample holder 120, lens $L_1$ 116, lens $L_2$ 118, and the detector 110 may be spaced along the optical axis 112 based on the focal lengths of the lenses $L_1$ 116 and $L_2$ 118. In this example, the sample holder 120 and lens $L_1$ 116 are spaced by a distance of about focal length $f_1$ of lens $L_1$ 116. Lenses $L_1$ 116 and $L_2$ 118 may be spaced by a distance of about the summation of focal lengths $f_1$ and $f_2$ of the lenses $L_1$ 116 and $L_2$ 118, respectively. Lens $L_2$ 118 and the detector 110 may be spaced by a distance of about focal length $f_2$ of lens $L_2$ 118.

The sample holder 120 is configured to hold a sample and to receive the illumination beam 104 such that the illumination beam 104 interacts with the sample for producing a sample beam. For example, the sample holder 120 may define an interior for holding a sample in position along the optical axis 112. The sample holder 120 may include two coverslips: a front coverslip 122 and a rear coverslip 124. The front coverslip 122 may be oriented at an angle α with respect to the optical axis 112. The rear coverslip 124 may be normal to the optical axis 112. Alternatively, the coverslips 122 and 124 may be oriented or positioned in any suitable manner.

The front coverslip 122 is positioned for receiving the illumination beam 104 and for allowing a portion of the illumination beam 104 to propagate through the front coverslip 122. Another portion of the illumination beam 104 incident on the front coverslip 122 may be reflected at a reflection angle of $2\alpha$ relative to the optical axis 112. The reflected portion of the illumination beam 104 serves as a reference with respect to the illumination beam 104 and is referred to herein as a reference beam 126. The numerical aperture (NA) of lens $L_1$ 116 may be at least $n \sin(2\alpha)$, where n is the immersion medium between lens $L_1$ 116 and a transparent sample 128.

The portion of the illumination beam 104 transmitted through the front coverslip 122 may interact with the sample 128 in a first instance directly after passing through the front coverslip 122. After interaction with the sample 128 in the first instance, the illumination beam 104 may be partially reflected from the rear coverslip 124 and interact with the sample 128 in a second instance. After interaction with the sample 128 in the second instance, a portion of the illumination beam 104 may exit the sample holder 120. The portion of the illumination beam 104 that exits the sample holder 120 after interacting with the sample 128 is referred to herein as a sample beam 130.

The reference beam 126 and the sample beam 130 are received by the lenses $L_1$ 116 and $L_2$ 118 such that they are directed to a detection plane 131, which corresponds to an array of pixels or active-pixel sensors of the detector 110 that can detect light. Lens $L_1$ 116 is positioned to receive the reference beam 126 and the sample beam 130, and to direct the reference beam 126 towards lens $L_2$ 118. The sample beam 130 propagates along the optical axis 112 such that the sample beam 130 reaches the detector 110 at an angle of incidence of about 0°. In contrast, the reference beam 126 reaches the detector 110 at an angle of incidence, or incidence angle, of $\beta = \arctan(\tan(2\alpha) \cdot f_1/f_2)$.

The incidence angle $\beta$ may be suitably adjusted such that the carrier frequency of the interferogram does not exceed a Nyquist frequency of the detector 110, which may occur if $\beta \leq \beta_{max} = \arcsin(\lambda/(2\Delta))$, where $\lambda$ is the wavelength of the source illumination beam 104 and $\Delta$ is the pixel size of the detector 110. For example, if $\Delta = 7.4$ μm and $\lambda = 633$ nm, $\beta_{max} = 2.45°$. If lenses $L_1$ 116 and $L_2$ 118 are selected for yielding a magnification of $f_1/f_2 = 10$, the inclination angle $\alpha$ of the front coverslip 122 may be adjusted to satisfy the equation $\alpha \leq \arctan(\tan(\beta_{max}) \cdot f_2/f_1)/2 = 12.25°$. If $\alpha = 12.25°$ is selected (such that $\beta = \beta_{max}$), and assuming that the immersion medium is air, $L_1$ may have a NA of $\sin(2\alpha) = 0.41$ or greater to ensure collection of the inclined reference beam by lens $L_1$ 116.

The detector 110 may receive the reference beam 126 and the sample beam 130, and may capture holograms projected by the beams onto an image sensor of the detector 110. Example image sensors include, but are not limited to, a charged coupled device (CCD) or complementary metal oxide semiconductor (CMOS) image sensor. The image sensor may capture holograms by converting received light into an electrical representation of the received light. The electrical representation of the holograms may be digitally stored by the detector 110.

As referred to herein, a hologram is a captured interference pattern between a light wavefield scattered from a sample or another object and a coherent background. The hologram may contain information about the entire three-dimensional wavefield. This information may be coded in the form of bright and dark microinterferences. The object wave can be reconstructed by illuminating the hologram with the reference wave again. This reconstructed wave may be indistinguishable from the original object wave. An observer may see a three-dimensional image which exhibits all the effects of perspective and depth of focus.

The digital holograms captured by the detector 110 may be retrieved by a computer 132, which may be separate or part of the detector, for subsequent processing in accordance with embodiments of the present disclosure. The computer 132 may include a holography module 134 configured to process the digital holograms by a suitable digital holography technique. The holography module 134 may include hardware, software, firmware, or combinations thereof.

In accordance with embodiments of the present disclosure, the detector 110 and/or an associated computer may apply an interferometric process for generating a holographic representation of the amplitude and phase of the optical field from a sample, such as the sample 128. The interferometric process may be, for example, an off-axis holographic process or any other suitable process for generating a holographic representation. The off-axis holographic process may include digital spatial filtering and digital propagation of a field along the optical axis.

In an example, the holography module 134 may be configured to generate an unwrapped phase profile of the sample 128. For example, the profile may be generated by use of a suitable off-axis WFDI technique, where for the sample holder 120, the measured phase is twice the sample phase. It is noted that since the sample beam 130 twice passes through the sample 128, a more accurate phase profile of the sample 128 may be measured by flatly positioning the sample 128 to the rear coverslip 124 of the sample holder 120. This condition may generally be valid, for example, for cell cultures after several hours of incubation.

The system 100 may include a display 136 configured to display one or more images of the holographic representation of a sample, such as sample 128. The display may be a display of any suitable computing device, such as, but not limited to, a desktop computer, notebook computer, smartphone, or the like.

It is noted that the spatial resolution of the phase profile may be limited by the pixel size of the camera and not by NA of the imaging optics. For this reason, the inclination angle of a top coverslip of an interferometric chamber may be determined by the camera pixel size as described herein. In the case of a diffraction limited system, the spatial resolution of the phase profile may be limited by the angle of the reference beam, rather than by the full NA of the optics.

A sample holder or interferometric chamber in accordance with embodiments of the present disclosure may include two coverslips as described with respect to the example of FIG. 1 or any other suitable number of coverslips. In this case, most of the illuminating light may be lost while transmitted through the interferometric chamber, rather than reflected to the camera. In addition, inner reflections from unused sides of coverslips can partially occlude a hologram. Therefore, to create a 1:1 ratio between the reference and sample beam intensities, a front facing surface of the rear coverslip 124 may be coated, for example, with a mirror coating having 100% or near 100% reflection. Further, for example, a front facing surface of the front coverslip 122 may be coated by a 38% reflection coating or near 38% reflection coating, where the reflected light forms the reference beam. In an example, the sample beam passes through the front coverslip twice, such that a front coverslip having a 38% reflection coating will result in a sample beam having 32% (62%×62%) of the initial intensity of the illumination beam. The reflectivity of the front coverslip 122 may have a reflectivity between about 35% and about 45%. A rear face surface of the front coverslip 122 may also have an anti-reflection coating for reducing unwanted reflections.

In example experiments described herein, the front face surface of the rear coverslip was coated with a 45 nm layer of gold (3% transmission measured) for forming a mirror. In other examples, the rear coverslip may include one or more layers of gold, silver, chromium, aluminum, any metal, dielectric material, the like, or combinations thereof. Further, the front face surface of the front coverslip was coated with a 7 nm layer of gold for forming a beam splitter (63% transmission measured). The camera used in the experiments was a 17 mW HeNe source. The lenses $L_1$ and $L_2$ had NAs of 0.45 that formed $f_2/f_1=10\times$ magnification. The detector was an Allied Vision Technologies Pike 032-B digital camera.

Figure 2:
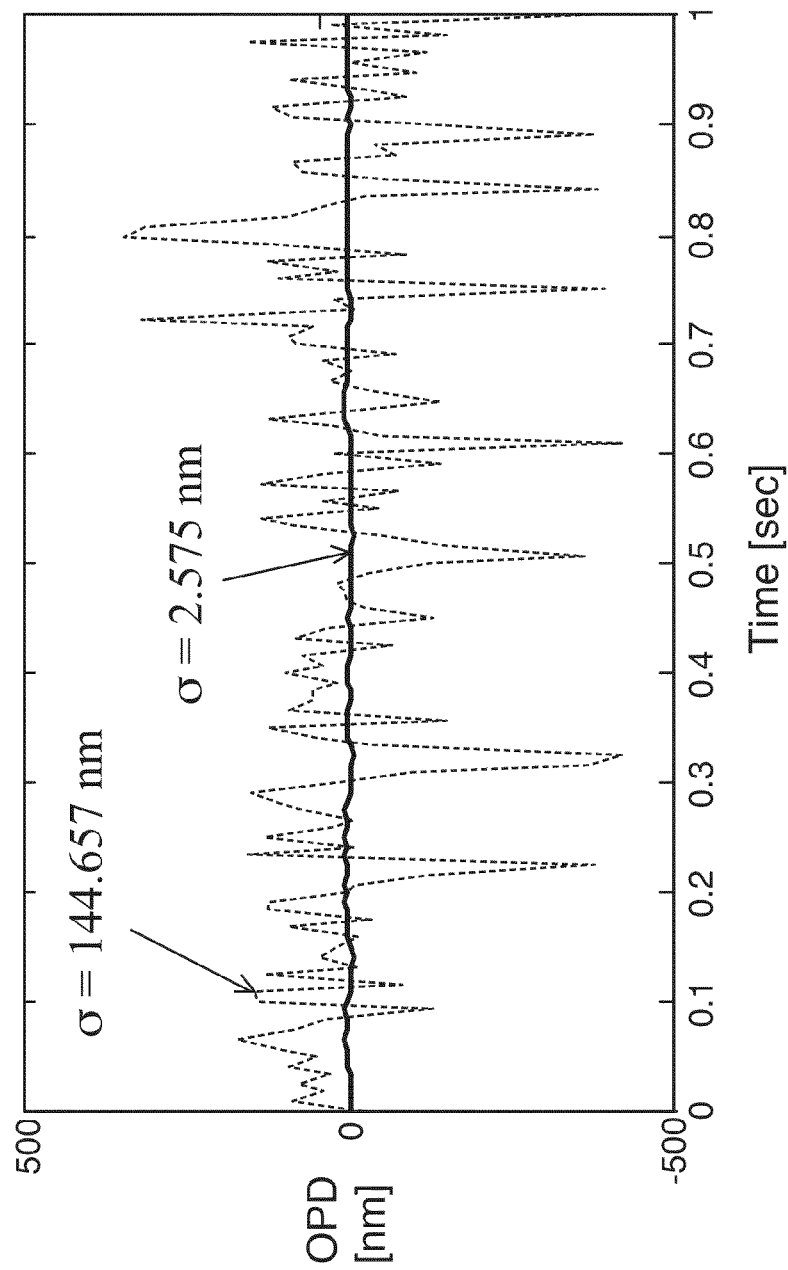
FIG. 2 is a graph showing temporal stability results of an InCh-based interferometric system according to an embodiment of the present disclosure in comparison to results obtained by use of a Michelson interferometer.

To demonstrate the utility of system and method embodiments disclosed herein as a close-to-common-path interferometer, an experiment for testing the inherent stability of the phase measurement in ambient conditions has been performed, where an optical table on which the system rests is not floating and the system is not caged to avoid regular-room air perturbations. This stability characterization was first performed for a InCh-based system as shown in FIG. 1, which results in OPD fluctuations with a standard deviation of 2.575 nm (solid-line graph shown in FIG. 2), an excellent stability for these ambient conditions. Particularly, FIG. 2 illustrates a graph showing inherent temporal stability of two interferometric systems in ambient conditions (non-floating optical table, no enclosure) at 120 frames per second, where results of the InCh-based system is shown by a solid line, and where results of a Michelson interferometer is shown by a dashed line. Both the InCh-based and the Michelson interferometers were built and tested on the same optical table and with the same equipment. For the Michelson interferometer, the experiment was performed by removing the front (inclined) coverslip of the InCh and positioning a mirror after the unused face of the beam splitter. Under the same ambient conditions, this conventional Michelson interferometer yielded OPD fluctuations with a standard deviation of 144.697 nm (dashed-line graph in FIG. 2), more than 1.5 orders of magnitude worse than that obtained by the InCh-based system. To illustrate the system's inherent stability in tightly controlled laboratory conditions, the experiment was repeated with a floating optical table and an airtight enclosure to prevent ambient air vibrations, resulting in OPD fluctuations with a standard deviation of 0.2 nm. This result is comparable or better than the results obtained by other off-axis close-to-common path interferometers, but without the use of specialized optical elements in the beam path.

In another experiment, the phase profiles of two different highly-dynamic transparent biological samples were acquired with the InCh-based system: beating myocardial cells in culture and an *Euglena gracilis*, a unicellular protist, moving in spring water. For the myocardial cell sample preparation, ventricular cardiomyocytes were enzymatically isolated from 2 day old neonatal Sprague-Dawley rats. The cells were diluted in cell seeding medium to a concentration of 120,000 cells/mL. The mirror-coated (rear) coverslip of the InCh was re-coated with fibronectin (25 µg/mL in phosphate buffered saline (PBS)) by placing it face-down on a 200 µL drop for 1 hr at room temperature. Each coverslip was seeded with 2 mL of the cell suspension and incubated at 37° C. for 2 days, when cells were completely adhered to the coverslip. Prior to the measurement, epinephrine (2 mM) was added to the suspension to enhance cell contractility.

Figure 3:
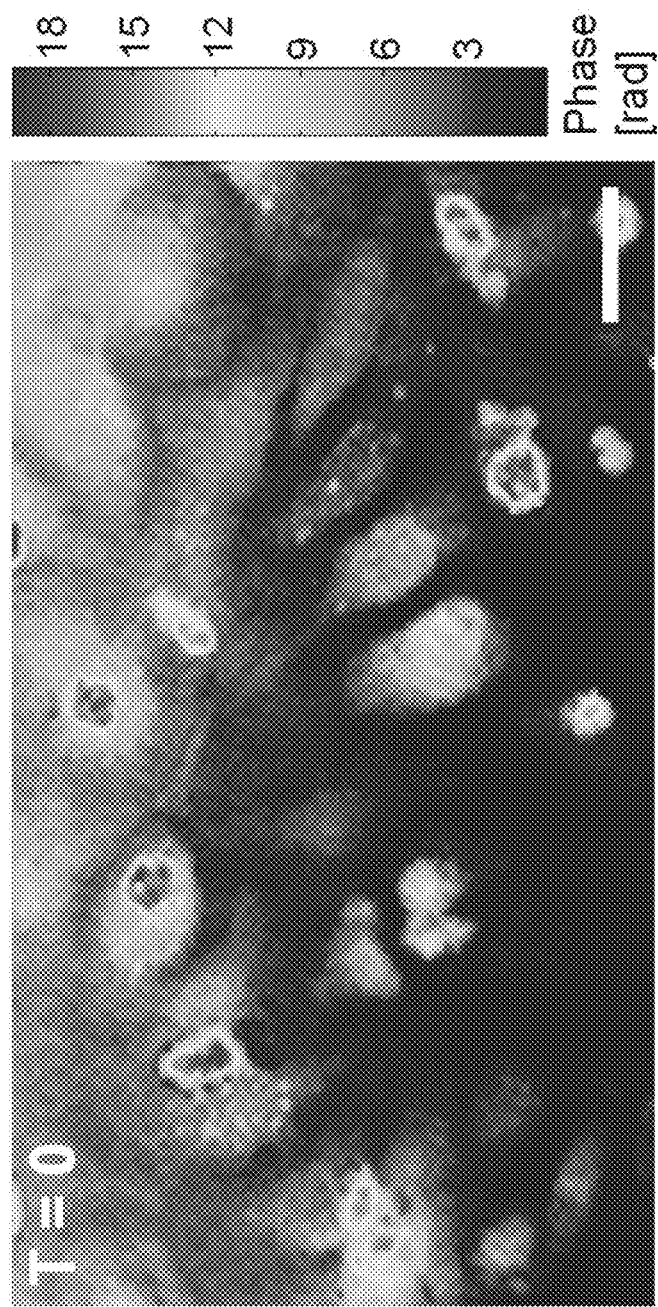
FIG. 3 is an image of spatial-temporal quantitative phase profiles of the myocardial cell culture obtained by the InCh-based system according to embodiments of the present disclosure.

FIG. 3 illustrates an image of spatial-temporal quantitative phase profiles of the myocardial cell culture obtained by the InCh-based system. As shown in FIG. 3, individual cells continuously change their 3D phase profiles rapidly and beat at different rates.

Figure 4:
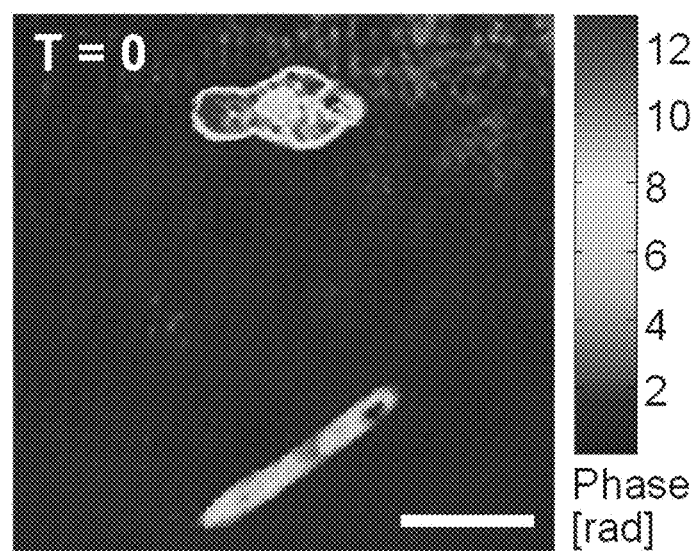
FIG. 4 is an image of *Euglena gracilis* (unicellular microorganism) under pressure as obtained by InCh-based WFDI phase imaging according to embodiments of the present disclosure.

FIG. 4 illustrates an image of *Euglena gracilis* (unicellular microorganism) under pressure as obtained by InCh-based WFDI phase imaging according to embodiments of the present disclosure. This second dynamic sample of *Euglena gracilis* from a bacteria-enhanced culture was chosen to demonstrate the quantitative phase acquisition capabilities of the proposed system. During the measurement, the Euglenas were forced to swim close to the rear, mirror-coated coverslip of the InCh by attaching another coverslip to it. This pressure application caused the Euglenas (e.g., the lower *Euglena* in FIG. 4) to swim relatively slower than usual. On the other hand, some Euglenas (e.g. the upper *Euglena* in FIG. 4) changed their 3D shapes fast due to the high pressure exerted on them by the additional coverslip.

In another application, system and method embodiments of the present disclosure may be used for analyzing erythrocyte morphology in blood smear samples. For example, the components shown in FIG. 1 may be assembled in a compact, portable instrument for field application to blood sample analysis. A system in accordance with embodiments of the present disclosure may obtain diagnostic information about, for example, sickle cells in an automated fashion. Systems and methods employing a sample chamber or InCh as disclosed herein may enable holographic quantitative measurement of cell morphology using a laser source, a 3-element optical train and a CCD camera. The InCh may enable the acquisition of robust holographic data without a complex interferometry scheme while also providing a low-cost disposable element to allow high throughput of samples.

In an example, the hologram captured by a detector according to embodiments of the present disclosure may be used to generate morphological profiles of cells in a sample. In a first example step, the hologram may be spatially Fourier transformed. Next, one of the first order images in the Fourier plane may be spatially filtered and inverse Fourier transformed. In a subsequent step, the phase of the resulting complex signal may be taken, and a simple phase unwrapping algorithm may be applied to solve $2\pi$ ambiguities. Next, the resulting phase is scaled by $2\pi/\lambda$ and the RBC refractive index to give a height profile. The thickness profile of individual or multiple cells in the sample may be visualized on a display and recorded so that morphological parameters can be calculated.

In accordance with embodiments of the present disclosure, the sample chamber or InCh may be removably attached to the imaging module. This feature may be advantageous, for example, when employing the system for use in the field.

In an experiment, a system in accordance with embodiments of the present disclosure have been used to quantitatively image sickle red blood cells (RBCs) and to measure the nanometer-scale fluctuations in their thickness as an indication of their stiffness. The system can simultaneously measure the fluctuations for multiple spatial points on each RBC and thus can yield a map describing the stiffness of each RBC in the field of view. Using this map, the local rigidity regions of each cell can be evaluated quantitatively. Further, since the applied process is a quantitative imaging technique rather than one-point-measurement, it may be used to simultaneously evaluate cell transverse morphology plus thickness in addition to its stiffness profile. Thus, the applied process can yield various physical properties for living RBCs in a noninvasive label-free manner, providing a sensitive tool for diagnosis.

In this experiment, WFDI measurements were performed by utilizing an interferometric microscopy system in accordance with embodiments of the present disclosure. Coherent laser light (17 mW HeNe) was spatially filtered and split to reference and object beams. The object beam was transmitted through the sample and magnified by a microscope objective (40×, 0.66 numerical aperture). The reference beam passed through a compensating microscope objective and combined with the object beam at a small angle between the direction of propagation of the two. A tube lens projects the combined fields on a digital camera (640×480, 7.4 µm×7.4 µm pixels, 120 full frames per second), where an off-axis interferogram of the sample is created. Using a single interferogram, the fully quantitative phase profile of the sample was obtained using an improved spatial filtering process that is performed in the image domain, followed by a quality-guided phase-unwrapping algorithm.

For this experiment, blood samples were obtained from two donors with sickle cell anemia (SCA) and from a healthy donor. Whole blood was collected in a 4.0 ml $K_2$EDTA Vacutainer tube (BD367861) or by needle stick and was stored at 4° C. A 50∓1 aliquot was washed twice in 1.0 ml Hanks Balanced Salt Solution (HBSS) without calcium, magnesium or phenol red (Invitrogen/Gibco 14175), and resuspended in a 2:1 mixture of endothelial basal media 2 (EBM-2) that contained growth supplements, and 10% fetal bovine serum (Lonza) that contained 10% fetal bovine serum and HBBS. Glass coverslips (22 mm×50 mm) were treated with 100∓1 1.0 mg/ml poly-D-lysine hydrobromide (SigmaAldrich P7280) in $dH_2O$ for 1 hour at 37° C., residual solution aspirated, and 50∓1 of the blood cell suspension allowed to attach for 30 minutes at 37° C. Attached cells were washed briefly in EBM:HBSS before imaging at 22° C.

Figures 5A, 5B:
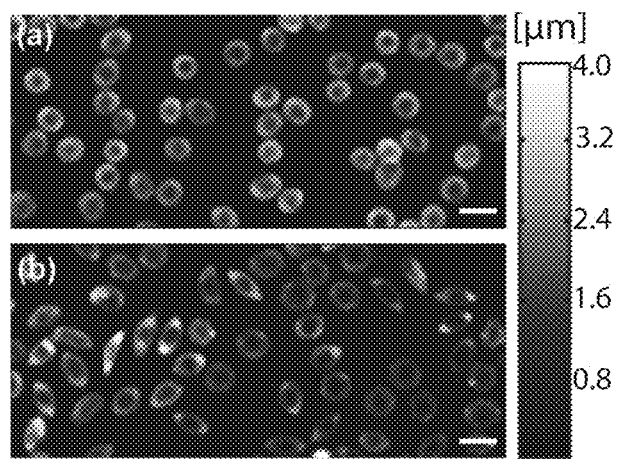
FIG. 5A is an image of a quantitative phase profile of the red blood cells from a healthy person.
FIG. 5B is an image of a quantitative phase profile of the red blood cells of a person with sickle cell anemia.

FIG. 5A is an image of a quantitative phase profile of the RBCs from a healthy person, demonstrating the characteristic round-biconcave shape which, by allowing an increased surface:volume ratio, facilitates diffusion into and out of the cell and helps deliver oxygen to body tissues, as well as increases cell deformability. The grayscale bar on the left side of FIGS. 5A and 5B can be used to interpret the quantitative maps in terms of cell thickness, where the bar represents 10 µm, and the grayscale bar represents thickness in µm. This interpretation is correct if a constant refractive index can be assumed for the entire cell thickness, which is a valid assumption for healthy RBCs. For sickle RBCs, this assumption is mostly correct, except perhaps in areas where polymerized hemoglobin is present, typically in thin (~20 nm diameter) rod-like fibers spanning the RBCs. In any case, the optical path delay profile can also be used directly to obtain stiffness information, even without calculating the thickness profile.

FIG. 5B is an image of a quantitative phase profile of the RBCs of a person with SCA. Referring to FIG. 5B, only a fraction of the sickle RBCs have lost their round-biconcave shape and becomes crescent shaped.

In contrast to conventional microscopy, WFDI allows quantitative dynamic analysis of the thickness fluctuations of the RBCs for each spatial point on the cell and for each of the cells in the field of view. Phase profiles have been acquired of 24 RBCs obtained from two different persons with SCA and 12 RBCs obtained from a healthy person. For each RBC, phase profiles were collected at a frame rate of 120 frames per second during 10 seconds and converted into thickness profiles. For each cell, we have calculated the standard deviation of the thickness fluctuations $\sigma_h$, which is inversely proportional to the stiffness map of the RBC. Averaging $\sigma_h$ over the entire RBC area, marked as $\langle \sigma_h \rangle$, gives an indication of the cell flexibility, since less rigid RBCs are expected fluctuate more than stiffer RBCs.

Figure 6:
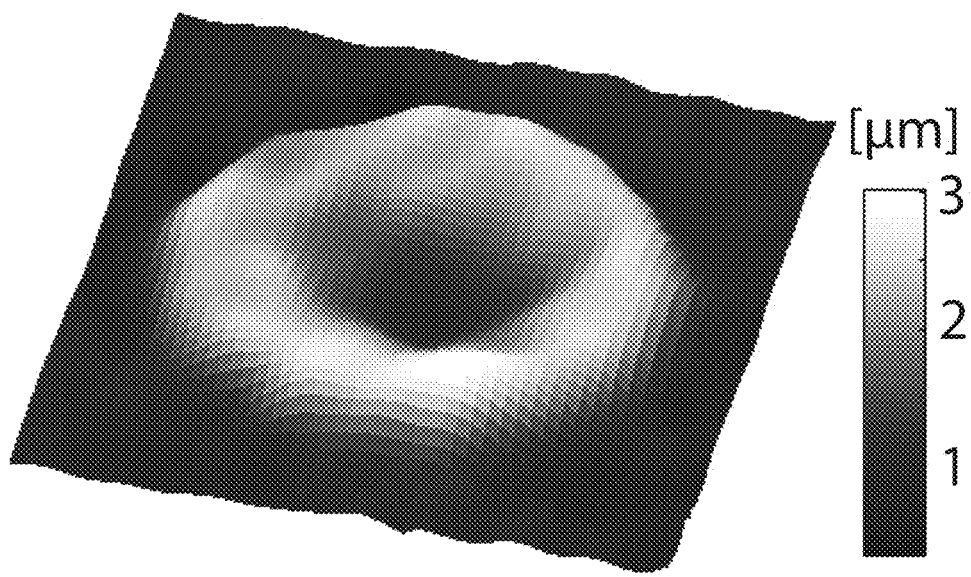
FIG. 6 is an image showing the dynamic quantitative phase profile and the associated thickness scalebar for one of the analyzed red blood cells obtained from the healthy person.

FIG. 6 is an image showing the dynamic quantitative phase profile and the associated thickness scalebar for one of the analyzed RBCs obtained from the healthy person. In FIG. 6, the scale bar represents 3 µm, and the grayscale bar represents thickness in µm. This specific cell yielded a standard deviation of the thickness fluctuations averaged over the cell area of $\langle \sigma_h \rangle$ =64.12 nm.

Figure 7:
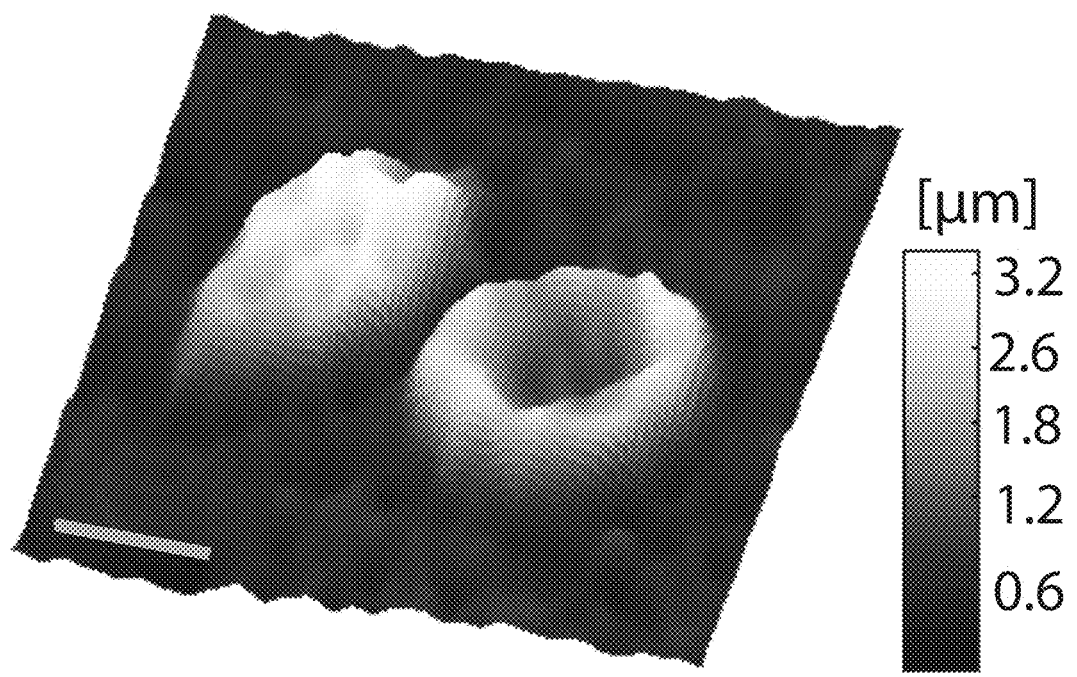
FIG. 7 is an image showing the dynamic quantitative phase profiles and the associated thickness scalebar of two red blood cells obtained from a person with sickle cell anemia.

For comparison, FIG. 7 is an image showing the dynamic quantitative phase profiles and the associated thickness scalebar of two RBCs obtained from a person with SCA. In FIG. 7, the scale bar represents 5 µm, and the grayscale bar represents thickness in µm. As can be seen in FIG. 7, the right cell has a regular round morphology, whereas the left cell has a crescent morphology. For these sickle RBCs, the standard deviation of the thickness fluctuations averaged over each of the cell areas is $\langle \sigma_h \rangle$ =28.73 nm for the round-morphology RBC and $\langle \sigma_h \rangle$ =13.54 nm for the crescent-morphology RBC. Thus, even though the sickle RBC on the right has a visibly normal morphology, it is found to be more than twice as stiff as the healthy RBC.

Figure 8:
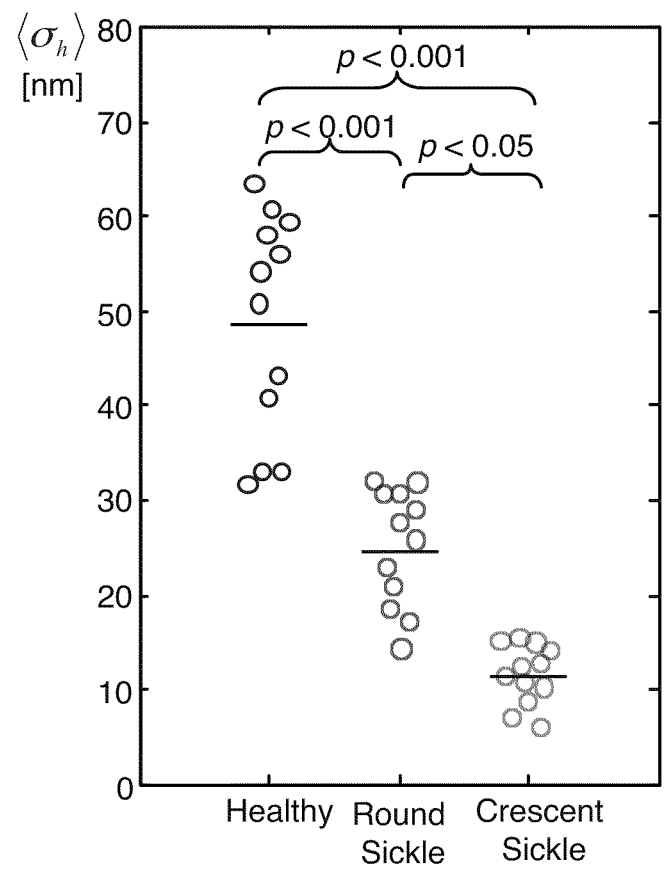
FIG. 8 is a chart showing averaged standard deviation of RBC thickness fluctuations $\langle \sigma_h \rangle$ obtained from the WFDI dynamic phase profiles of red blood cells of three groups: 12 round-morphology red blood cells from a healthy person, 12 round-morphology red blood cells from two persons with sickle cell anemia.

FIG. 8 illustrates a chart showing averaged standard deviation of RBC thickness fluctuations $\langle \sigma_h \rangle$ obtained from the WFDI dynamic phase profiles of RBCs of three groups: 12 round-morphology RBCs from a healthy person, 12 round-morphology RBCs from two persons with SCA, and 12 crescent-morphology RBCs from two persons with SCA. Each of the two groups of 12 sickle RBCs was composed of 5-7 RBCs from the first person with SCA and 5-7 RBCs from the second person with SCA, where no significant difference was seen between the $\langle \sigma_h \rangle$ values of the RBCs from the two individuals with SCA. The healthy RBCs yielded $\langle \sigma_h \rangle$ =51.07±12.02 nm (which compares favorably with the value obtained for healthy RBCs by Park et al. [15]), the round-morphology RBCs from SCA individuals yielded $\langle \sigma_h \rangle$ =21.76±7.64 nm, and the crescent-morphology RBCs from SCA individuals yielded $\langle \sigma_h \rangle$ =13.82±3.92 nm. These results demonstrate that the healthy RBCs are 2-3 time less stiff than the round-morphology sickle RBCs, and the latter are approximately half as stiff as the sickle crescent-morphology RBCs. Greater statistical difference, indicated by the lower p-values (p<0.001), is obtained between the group of healthy RBCs and each group of the sickle RBCs than between the two groups of sickle RBCs (p<0.01). The high statistical significance of the difference between the round-morphology RBCs from SCA individuals and the healthy RBCs demonstrates that although the sickle RBC shape might visibly appear to be the same as healthy RBCs, analyzing their thickness fluctuations by WFDI gives a clear indication that they are sickle RBCs.

The above experimentation results demonstrate that WFDI is able to obtain dynamic quantitative phase profiles of sickle RBCs in a noncontact, noninvasive manner. Based on these profiles, the nanometer scale thickness fluctuations of the RBCs have been calculated, and a metric of RBC stiffness has been obtained. Sickle RBCs were found to be significantly stiffer than healthy RBCs. Further, it has been demonstrated that it is possible to differentiate between sickle RBC morphologies taken from the same subjects by analyzing their thickness fluctuations, where crescent-morphology RBCs are more rigid (fluctuate less) than round-morphology RBCs. System and method embodiments can be used for diagnosis and monitoring of SCA, as well as usefulness as a research tool, since therapeutic agents that decrease sickling can be expected to improve the abnormal cell rigidity described here. In addition to helping identify and prove the effectiveness of new SCA therapeutic approaches, this technique may be useful in differentiating SCA from sickle cell trait, a condition in which there is one gene for the formation of hemoglobin S and one for the formation of normal hemoglobin. Usually, people with sickle cell trait live relatively healthy lives but if their partner has sickle cell trait as well, there is 25% chance that their child will have sickle cell disease. Sickle-trait cells generally do not form sickled cells, and the simplest test for hemoglobin S cannot distinguish between SCA and sickle cell trait.

Figure 9:
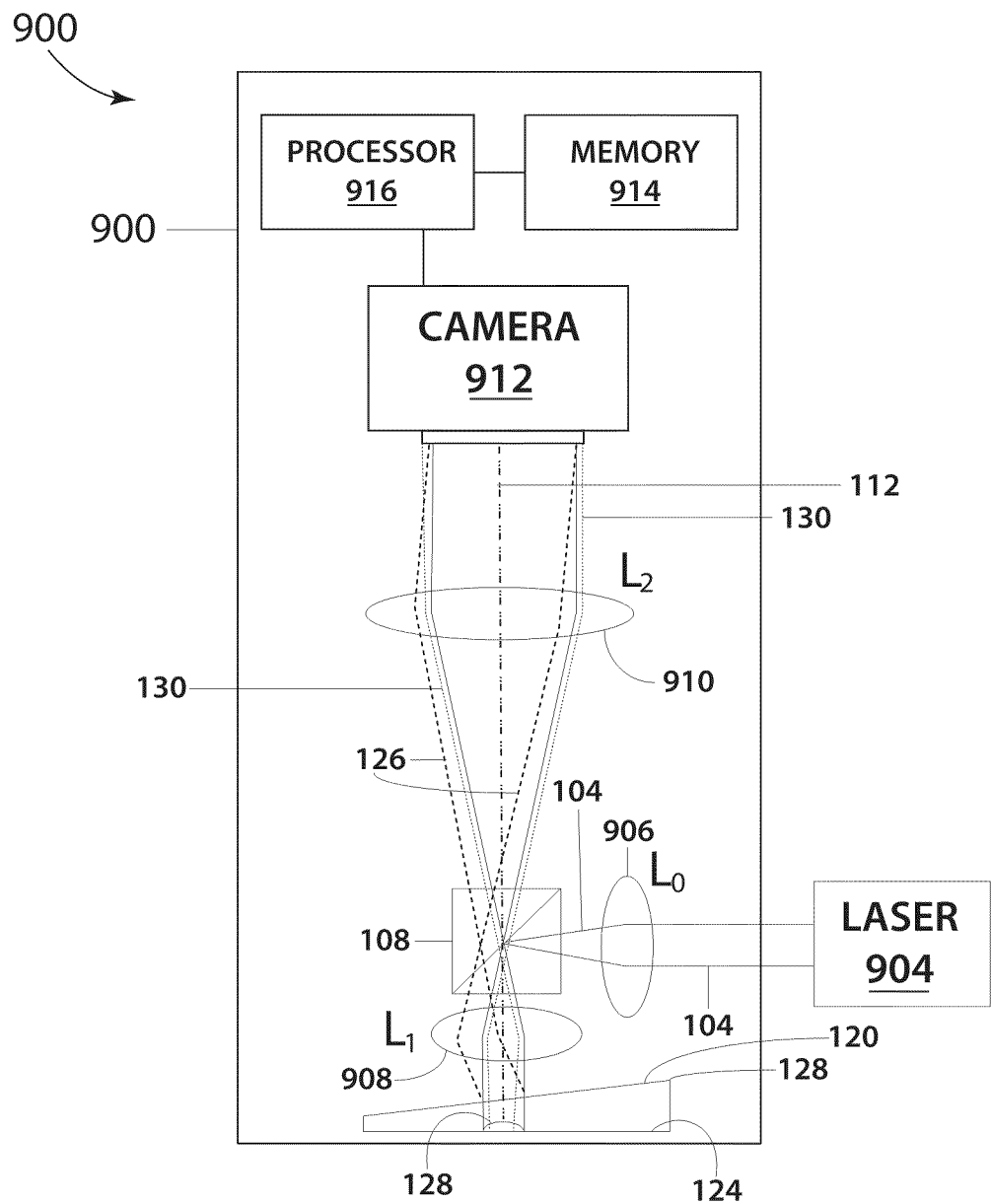
FIG. 9 is a schematic diagram of another interferometric system in accordance with embodiments of the present disclosure.

In accordance with another embodiment of the present disclosure, FIG. 9 illustrates a schematic diagram of another interferometric system 900. In this example, the system 900 is in the form of a compact, portable instrument including a frame 902 for holding components of the system 900. Referring to FIG. 9, the system 900 may include a laser 904 configured to generate an illumination beam 104. The system 900 may include a lens $L_0$ 906 position to expand the illumination beam 104. The beam splitter 108 may receive the illumination beam 104 and reflect the illumination beam 104 in a direction substantially along the optical axis 112. A lens L1 908 may receive the illumination beam 104, magnify the beam, and direct the beam towards the sample 128 held by the sample holder (or InCh) 120 in accordance with embodiments of the present disclosure.

A portion of the illumination beam 104 may be reflected by the front coverslip 122 for generating the reference beam 126 in accordance with embodiments of the present disclosure. Another portion of the reference beam 126 may pass through the front coverslip 122 for interaction with the sample 128. Interaction of this portion of the reference beam 126 with the sample 128 may generate the sample beam 130 in accordance with embodiments of the present disclosure.

The reference beam 126 and the sample beam 130 may propagate substantially in the direction of the optical axis 112 towards a lens $L_2$ 910 for focusing on an array of image sensors of a digital camera 912. The image sensors may capture holograms of the sample 128 by converting received light into an electrical representation of the received light. The electrical representation of the holograms may be digitally stored in a memory 914. The digital holograms stored in the memory 914 may be subsequently processed in accordance with embodiments of the present disclosure. A processor 916 and the memory 914 may in together as a holography module having functions in accordance with embodiments of the present disclosure.

As will be appreciated by one skilled in the art, aspects of the presently disclosed subject matter may be embodied as a system, method or computer program product. Accordingly, aspects of the presently disclosed embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the presently disclosed embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the presently disclosed embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the presently disclosed embodiments are described herein with reference to diagrams of methods, apparatus (systems) and computer program products according to embodiments of the present disclosure. For example, aspects of the present subject matter are described with reference to the system of FIG. 1. It will be understood that the holograph module 134 shown in FIG. 1 or any other suitable components described herein can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the diagram block or blocks.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the presently disclosed embodiments has been presented for purposes of illustration and description, but is not intended to be exhaustive or limited to the embodiments in the form disclosed. Many modifications and variations will be apparent to those of ordinary skill in the art without departing from the scope and spirit of the presently disclosed subject matter. The embodiment was chosen and described in order to best explain the principles of the present subject matter and the practical application, and to enable others of ordinary skill in the art to understand the present disclosure for various embodiments with various modifications as are suited to the particular use contemplated.

What is claimed:

1. An interferometric system comprising:
a light source configured to generate an illumination beam that propagates towards a sample;
a sample holder defining an interior for holding the sample and including a partially reflective cover for allowing a first portion of the illumination beam to pass therethrough to interact with the sample to produce a sample beam that propagates substantially along an optical axis, wherein the partially reflective cover is oriented at an angle with respect to the optical axis for reflecting a second portion of the illumination beam to produce a reference beam that propagates at a predetermined angle with respect to the optical axis;
an imaging module positioned to receive the sample and reference beams and configured to redirect the reference beam towards the optical axis at a detection plane; and
a detector positioned to intercept the sample and reference beams along the optical axis and the detection plane, and configured to generate a holographic representation of the sample based on the sample and reference beams.

2. The interferometric system of claim 1, wherein the light source is a laser.

3. The interferometric system of claim 1, further comprising a spatial filter-beam expander configured to spatially filter and expand the illumination beam.

4. The interferometric system of claim 1, further comprising a beam splitter configured to direct the illumination beam along the optical axis.

5. The interferometric system of claim 1, wherein the imaging module comprises lenses positioned along the optical axis for focusing the illumination beam on the sample.

6. The interferometric system of claim 1, wherein the imaging module comprises first and second lenses, wherein the first lens is positioned to receive the reference beam and to direct the reference beam towards the second lens, and
wherein the first lens has a numerical aperture of at least $n \sin(2\alpha)$, wherein n is an immersion medium between the lens and the sample, and wherein $\alpha$ is the angle defining the orientation of the partially reflective cover of the sample holder.

7. The interferometric system of claim 6, wherein the second lens is positioned to receive the reference and sample beams and to direct the reference beam towards the detector.

8. The interferometric system of claim 7, wherein the angle is a reflection angle, and
wherein the first and second lenses are positioned and configured to direct the reference beam towards the detector for receipt by the detector at an incidence angle that is less than the arcsin of a ratio of a wavelength of the illumination beam to twice the dimension of pixels of the detector.

9. The interferometric system of claim 1, wherein the partially reflective cover has a reflectivity of between 35% and 45%.

10. The interferometric system of claim 1, wherein the partially reflective cover comprises metal.

11. The interferometric system of claim 1, wherein the partially reflective cover comprises a layer of one or more of gold, silver, chromium, aluminum, and dielectric material.

12. The interferometric system of claim 1, wherein the sample holder includes a removable coverslip configured to hold the sample in position for interacting with the illumination beam.

13. The interferometric system of claim 12, wherein the removable coverslip includes a surface for holding the sample, and
wherein the surface of the removable coverslip is positioned along the optical axis and is oriented approximately normal with respect to the optical axis.

14. The interferometric system of claim 12, wherein the removable coverslip is at least partially reflective.

15. The interferometric system of claim 12, wherein the removable coverslip is fully reflective.

16. The interferometric system of claim 1, wherein the detector is configured to apply an interferometric process for generating the holographic representation of the amplitude and phase of the optical field from the sample.

17. The interferometric system of claim 16, wherein the interferometric process is an off-axis holographic process.

18. The interferometric system of claim 16, wherein the off-axis holographic process includes digital spatial filtering and digital propagation of a field along the optical axis.

19. The interferometric system of claim 1, wherein the detector comprises a display configured to display one or more images of the holographic representation of the sample.

20. An interferometric method comprising:
generating an illumination beam;
providing a sample holder defining an interior for holding a sample and including a partially reflective cover for allowing a first portion of the illumination beam to pass therethrough to interact with the sample to produce a sample beam that propagates substantially along an optical axis, wherein the partially reflective cover is oriented at an angle with respect to the optical axis for reflecting a second portion of the illumination beam to produce a reference beam that propagates at a predetermined angle with respect to the optical axis;

providing an imaging module positioned to receive the sample and reference beams and configured to redirect the reference beam towards the optical axis at a detection plane;

providing a detector positioned to intercept the sample and reference beams along the optical axis and the detection plane; and generating a holographic representation of the sample based on the sample and reference beams.

21. The interferometric method of claim 20, further comprising spatially filtering and expanding the illumination beam.

22. The interferometric method of claim 20, further comprising focusing the illumination beam on the sample.

23. The interferometric method of claim 20, wherein the imaging module comprises first and second lenses, wherein the first lens is positioned to receive the reference beam and to direct the reference beam towards the second lens, and wherein the first lens has a numerical aperture of at least $n \sin(2\alpha)$, wherein $n$ is an immersion medium between the lens and the sample, and wherein $\alpha$ is the angle defining the orientation of the partially reflective cover of the sample holder.

24. The interferometric method of claim 23, wherein the second lens is positioned to receive the reference and sample beams and to direct the reference beam towards the detector.

25. The interferometric method of claim 24, wherein the angle is a reflection angle, and wherein the first and second lenses are positioned and configured to direct the reference beam towards the detector for receipt by the detector at an incidence angle that is less than the arcsin of a ratio of a wavelength of the illumination beam to twice the dimension of pixels of the detector.

26. The interferometric method of claim 20, wherein the partially reflective cover has a reflectivity of between 35% and 45%.

27. The interferometric method of claim 20, wherein the partially reflective cover comprises a layer of one or more of gold, silver, chromium, aluminum, and dielectric material.

28. The interferometric method of claim 20, wherein the sample holder includes a removable coverslip configured to hold the sample in position for interacting with the illumination beam.

29. The interferometric method of claim 28, wherein the removable coverslip includes a surface for holding the sample, and wherein the surface of the removable coverslip is positioned along the optical axis and is oriented approximately normal with respect to the optical axis.

30. The interferometric method of claim 28, wherein the removable coverslip is at least partially reflective.

31. The interferometric method of claim 28, wherein the removable coverslip is fully reflective.

32. The interferometric method of claim 20, wherein generating the holographic representation comprises applying an interferometric process for generating the holographic representation of the amplitude and phase of the optical field from the sample.

33. The interferometric method of claim 32, wherein the interferometric process is an off-axis holographic process.

34. The interferometric method of claim 33, wherein the off-axis holographic process includes digital spatial filtering and digital propagation of a field along the optical axis.

35. The interferometric method of claim 20, further comprising displaying one or more images of the holographic representation of the sample.

* * * * *